Sept. 23, 1969   D. W. CARLSON ET AL   3,468,020
METHOD OF ANCHORING A METALLIC MEMBER TO PLASTIC
Filed Dec. 12, 1966   2 Sheets-Sheet 1

DONALD W. CARLSON
PHILLIP E. ELLER
INVENTORS

BY *John H. Faulkner*
*William E. Johnson*

ATTORNEYS

Sept. 23, 1969  D. W. CARLSON ET AL  3,468,020
METHOD OF ANCHORING A METALLIC MEMBER TO PLASTIC
Filed Dec. 12, 1966  2 Sheets-Sheet 2
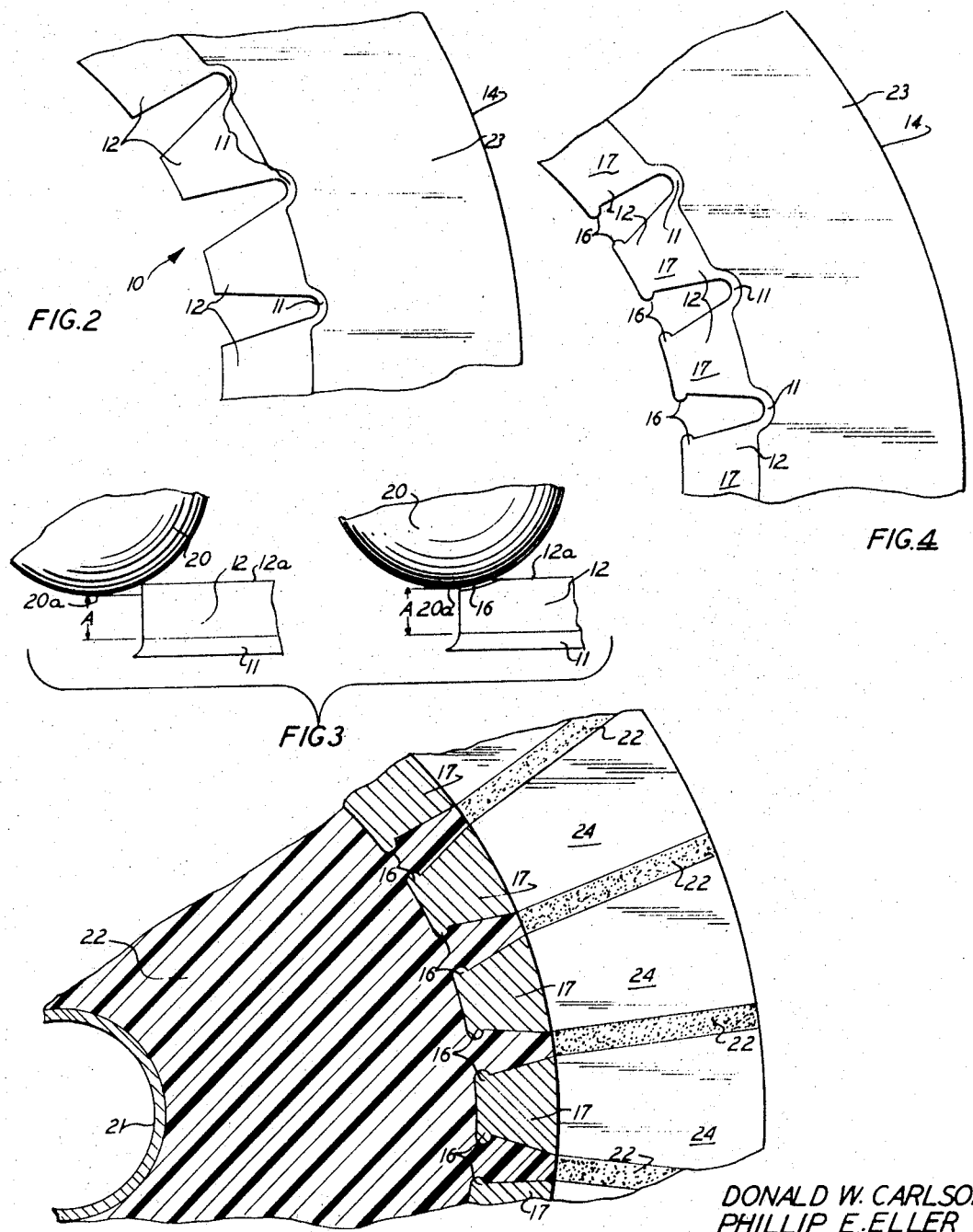
DONALD W. CARLSON
PHILLIP E. ELLER
INVENTORS
BY John K. Faulkner
William E. Johnson
ATTORNEYS

# United States Patent Office 3,468,020
Patented Sept. 23, 1969

1

3,468,020
METHOD OF ANCHORING A METALLIC MEMBER TO PLASTIC
Donald W. Carlson and Phillip E. Eller, Belleville, Mich., assignors to Ford Motor Company, Dearborn, Mich., a corporation of Delaware
Filed Dec. 12, 1966, Ser. No. 600,932
Int. Cl. H01r *39/04*
U.S. Cl. 29—597                     4 Claims

ABSTRACT OF THE DISCLOSURE

This disclosure relates specifically to a method of anchoring copper commutator segments to a plastic dielectric member by the following steps. First, a plurality of ribs are formed longitudinally along the interior surface and inwardly toward the central axis of the commutator. Each rib subsequently forms an individual commutator segment. Second, a surface on an object is moved along the ribs such that a portion of the metal forming each of the ribs is deformed both toward the interior surface of the commutator and outwardly with respect to the original configuration of each of the ribs whereby each original rib assumes a generally T-shaped configuration. Plastic is then flowed into engagement with the T-shaped rib and allowed to solidify whereby the T-shape of each of the ribs provides anchoring surfaces for insuring the retention of the individual commutator segments in close physical association with the plastic.

---

This invention relates to a method of anchoring a metallic member to plastic and, more particularly, to a method of anchoring a copper commutator having an interior, circular surface centered about and parallel to the central axis thereof to plastic such that the commutator may be utilized in constructing, for example, a starting motor armature for an automobile vehicle.

The commutator, which forms a portion of the armature of a starting motor utilized in an automative vehicle, is mounted on a shaft which is rotatably driven when current is supplied to the starting motor from a battery. The commutator itself is mounted about the shaft in spaced, insulated relationship therewith by means of a plastic, dielectric member. Since during operation of the vehicle, the shaft supporting the commutator may be driven at relatively high speeds, the commutator must be secured to the plastic member in such a manner that the torque applied to the commutator at high rotative speeds thereof is insufficient to loosen the commutator segments from the plastic.

The method of this invention is designed specifically for anchoring a commutator to a plastic, dielectric member which supports the commutator in spaced, insulated relationship to the shaft of a starting motor utilized in a motor vehicle. More specifically, the method of this invention is practiced on a copper commutator having an interior, circular surface centered about and parallel to the central axis thereof by forming on the interior surface, at equally spaced positions about the circumference thereof, a plurality of ribs which form individual commutator segments. The ribs extend uniformly both longitudinally along the interior surface and inwardly toward the central axis of the commutator. Each of the individual ribs is engaged by a surface on an object substantially harder than copper. The surface is moved along each of the individual ribs such that a portion of the metal forming each of the ribs is deformed downwardly toward the interior surface of the commutator and outwardly with respect to the original configuration of each of the ribs thereby to form an additional rib on both sides

2 of each original rib. Such deformed ribs provide a plurality of generally T-shaped ribs extending upwardly from the interior surface of the commutator and laterally therealong. Plastic molding material is flowed into engagement with the T-shaped ribs of the commutator. The plastic molding material is allowed to solidify whereby the T-shaped ribs provide anchoring surfaces on the copper commutator for insuring the retention of the plastic in close physical association with each of the commutator segments.

It is a principal object of this invention to provide a method of anchoring a metallic member to plastic.

It is another object of this invention to provide a method of anchoring a copper commutator to plastic.

It is still another object of this invention to provide a method of anchoring a copper commutator to plastic in such a manner that the commutator may be rotated at relatively high rates of speed while a close physical association is maintained between the commutator segments and the plastic.

It is a further object of this invention to provide a method of anchoring a copper commutator to a plastic supporting and insulating member, which method is simple and efficient in operation and economical to utilize.

Other objects and attendant advantages of the method of the present invention may be more readily realized when the specification is considered in conjunction with the attached drawings in which:

FIGURE 2 is an enlarged view showing a portion of the commutator before a deforming step in the method of this invention;

FIGURE 3 is a view showing graphically the deforming step;

FIGURE 4 is an enlarged view showing a portion of the commutator after the deforming step; and FIGURE 5 is an enlarged view showing a portion of the commutator unit after finishing operations have been performed thereon.

Figure 1:
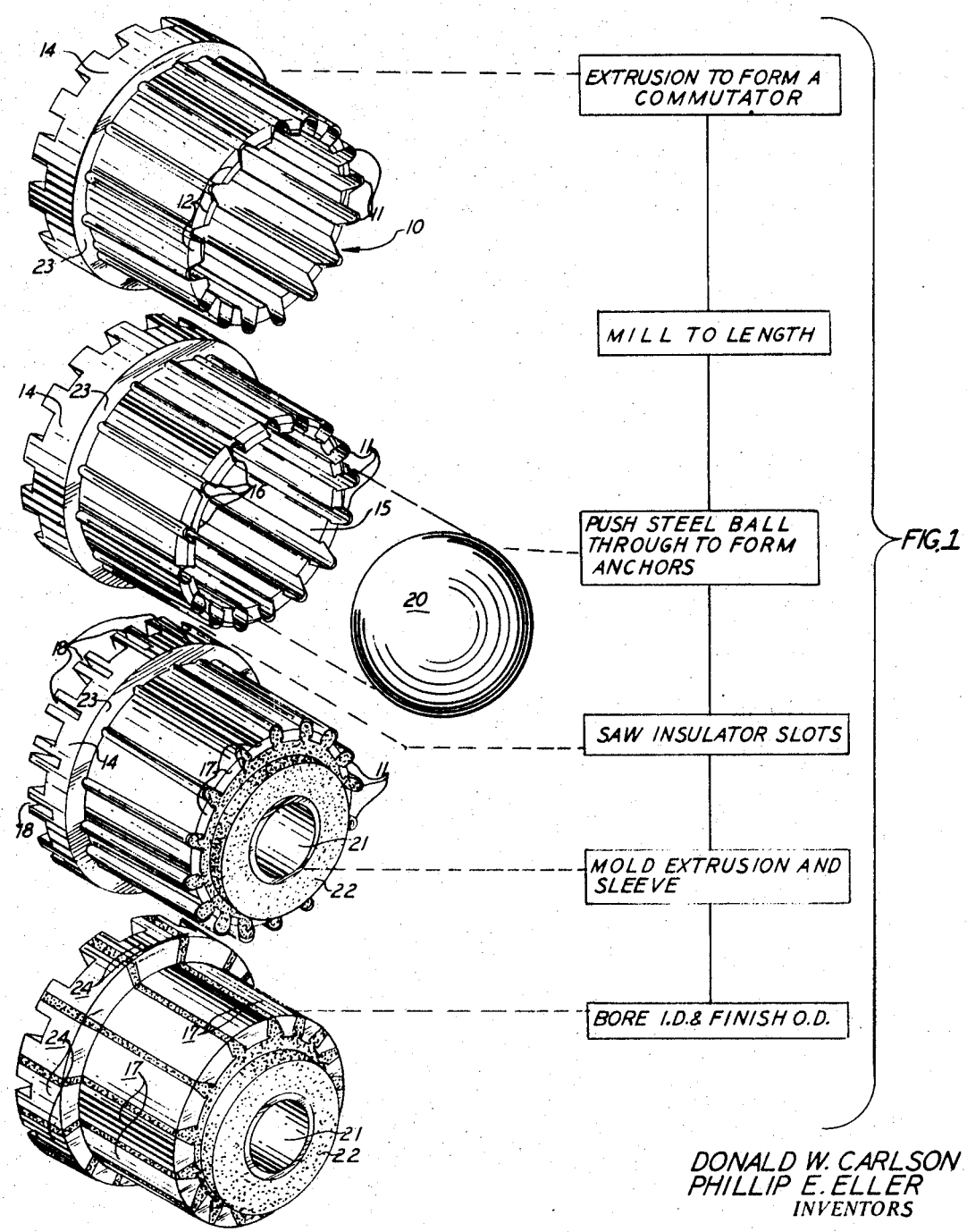
FIGURE 1 is a flow chart showing the shape assumed by the commutator after various ones of the steps of the method of this invention.

Referring now the drawings in which like reference numerals designate like parts through the several views thereof, there is shown in FIGURE 1, in outline form, the general steps employed in the method of this invention. While the preferred embodiment of the method of this invention is described in conjunction with the anchoring of copper commutators to plastic spacing and insulating members, it is understood that the method of this invention is applicable to the anchoring of many other types of metals and metallic alloys to plastic.

The method of this invention, as employed in the manufacture of commutators, is initiated by forming a plurality of ribs at equally spaced positions about the circumference of the interior surface of the commutator. The ribs may be formed simultaneously with the formation of the commutator by extruding a suitable extrusion blank to form a commutator blank 10 with internal ribs.

A method of extruding the commutator blank 10 is described in our co-pending application Ser. No. 601,078, filed Dec. 12, 1966, now Patent No. 3,423,819 and assigned to the same assignee as this application. Briefly, in performing the method described in our co-pending application, a straight length of copper metal having two end surfaces is formed into a circular configuration with opposite ends of the metal being adjacent one another in spaced, parallel relationship. The metal in the area of the two adjacent ends is subjected to an electron beam welding operation to form a welded joint therebetween whereby a circular extrusion blank is formed. The extrusion blank is positioned in an extrusion press, and an extrusion operation is carried out thereon to form the commutator blank 10. Reference is made to our co-pending application for a more detailed description of the method of forming commutator blanks as briefly outlined above. While the method of forming the commutator blank described in the co-pending application is preferred, the commutator blank 10 may also be formed in any of the several ways known to those skilled in the art.

During the commutator extrusion operation, as best depicted in FIGURE 2, the blank 10 is formed such that on the interior surface thereof, as defined by a plurality of bridging members 11, there is formed a plurality of equally spaced ribs 12. These ribs 12 extend uniformly both longitudinally along the interior surface and inwardly toward the central axis of the commutator blank 10. Also, the ribs 12 are formed such that their width at the base or point of attachment to the interior surface is greater than or equal to their width at the top thereof. When the commutator blank is finished, each of the ribs 12 will form an individual commutator segment.

After the extrusion of the blank 10, an end milling operation is performed thereon by any suitable milling machine so as to face the front surface 13 and the rear of an enlarged section 14 thereof. The end milling operation also reduces the length of the blank to the required dimension.

After the milling operation has been performed on a particular blank 10, the individual ribs 12 are deformed downwardly toward the interior surface defined by the plurality of members 11 and outwardly with respect to their original configuration by pushing a steel sphere 20 into the central opening 15 of the commutator blank 10. The steel sphere 20 is of slightly larger diameter than the diameter of the central opening 15 between opposite ribs 12 of the commutator blank 10.

As best seen in the graphic view of FIGURE 3, when the sphere 20 initially engages the individual ribs 12, a portion 20a of the surface of the sphere 20, spaced in front of the engaged ends of the ribs, terminates inwardly of the top surface 12a of each of the ribs. As further illustrated in FIGURES 3 and 4, as the sphere 20 is pushed by suitable means (not shown) through the central opening 15 of the commutator blank 10, the ribs 12 are progressively deformed. The sphere is moved along the ribs such that its center remains on the central axis of the commutator blank 10. By maintaining the surface of the sphere in the same relative position with respect to the individual ribs as the surface initially assumed when moved into engagement therewith (that position being denoted by the letter A in FIGURE 3), the surface of the sphere progressively deforms each of the individual ribs 12 such that on opposite sides of each rib 12 there is formed an addiitonal rib 16 (see FIGURE 4). The original ribs 12, with the additional ribs 16 formed thereon, now form a plurality of substantially T-shaped ribs extending upwardly from the interior surface 11 of the commutator blank 10. It is the unique T-shaped anchor ribs, generally indicated by the numeral 17 in FIGURE 4, formed by the method of this invention which provide firm anchoring surfaces for the plastic subsequently flowed about the plurality of ribs.

After formation of the T-shaped anchoring ribs 17 on the commutator blank 10, a plurality of insulator slots 18 are sawed in the enlarged section 14 of the commutator blank 10. The insulator slots are provided at this stage in the manufacture of the commutator such that when plastic is flowed into the commutator blank, the plastic will flow into the insulator slots thereby to form a plurality of spaced, insulated elements in the enlarged section of the commutator for attaching electrical wires to the commutator. The slots 18 are directed radially outward of the central axis of the commutator and are located in alignment with the bridging members 11 and between adjacent ones of the ribs 12.

After the insulator slots 18 have been sawed in the commutator blank 10, the blank is inserted in a suitable molding die (not shown). There is also inserted in the die an aluminum sleeve 21 which is aligned along the central axis of the commutator. The molding die is then closed about the commutator blank 10 and the sleeve 21, and phenolic molding material 22 is injected into the area between the outer circumferential surface of the sleeve 21 and the interior surface defined by the members 11 of the blank 10. The injected phenolic molding material flows about the T-shaped ribs 17, and when the molding material solidifies, the T-shaped ribs 17 provide firm anchoring surfaces for holding the commutator blank 10 to the molding material 22.

After the molding plastic 22 has solidified, the sleeve 21 is bored to finish the inside diameter thereof to the required size. The outer circumferential surface of the commutator blank 10 is also finished in a manner such that the bridging members 11 are machined away whereby the T-shaped ribs 17 now provide individual, insulated commutator segments. As best seen in FIGURE 5, the insulated commutator segments 17 are firmly anchored to the molding plastic 22 because of the T-shaped configuration of each segment. The front 23 of the enlarged section 14 of the commutator blank 10 is also machined so that individual copper connecting members 24 are obtained which are in spaced, insulated relationship with respect to one another since plastic molding material now fills the insulator slots 18. The commutator units, when finished to this point, may be fitted onto a suitable shaft for subsequent use in constructing the armature of a starting motor of a motor vehicle.

By utilization of the anchoring method of this invention to form a commutator which is mounted on a shaft, it has been found that at normal operating temperatures, the commutators may be rotated at speeds up to 23,000 r.p.m. without destruction of the commutator, that is, without individual commutator segments becoming unanchored from the plastic insulating material. The spin at a speed of 23,000 r.p.m. is well above that required for normal operation of the commutator in the starting motor of a motor vehicle. Also, at an operating temperature of approximately 350° F., the commutator structure made by the method of this invention, was subjected to a spin rate of 18,000 r.p.m. for one minute without any adverse effects.

The method of this invention has been disclosed in a preferred embodiment thereof. In the preferred embodiment the commutator blank was described as being made by an extrusion process wherein bridging members were provided between adjacent sides. It is apparent, however, that the method of this invention can be applied to form anchoring ribs on individual commutator segments which are not interconnected. More particularly, individual commutator segments may be located in a fixture with spacing and insulated elements, such as mica, therebetween. A sphere may then be pushed through the central opening defined by the individual segments to form anchors thereon. Thus, the method of this invention may be utilized to form anchoring ribs on inwardly extending ribs, which ribs are not physically interconnected at the time anchoring ribs are placed thereon.

There has been disclosed herein a method of anchoring a metallic member to plastic. The method, while described specifically in conjunction with the manufacture of commutators for utilization in a starting motor of an automobile vehicle, is applicable to the anchoring of many various types of metallic members to a plastic material. The method disclosed herein provides a reliable anchoring of metal members to plastic and, more particularly, provides a method of anchoring commutator segments to a plastic, insulating and spacing member, which method is efficient and reliable in operation and economical to utilize.

The method of this invention will have many apparent modifications to those skilled in the art, and it is intended that all such modifications which fall within the true spirit and scope of this invention be included within the scope of the appended claims.

What is claimed is:
1. A method of anchoring a copper commutator having an interior, circular surface centered about and parallel to the central axis thereof to plastic which comprises the steps of:
   forming at equally spaced positions about the circumference of said interior surface of the commutator a plurality of ribs of generally rectangular cross section which extend uniformly both longitudinally along said interior surface and inwardly toward said central axis of the commutator;
   engaging each of said plurality of ribs at the same end thereof with a surface formed on an object substantially harder than copper in such a manner that a portion of said surface spaced in front of said engaged ends of said ribs terminates inwardly of the top surface of each of said engaged ribs;
   moving said surface on said object along said ribs and maintaining said surface at the same relative position with respect to said ribs as said surface initially assumed when moved into engagement therewith, so that said surface progressively deforms a portion of the metal forming each of said ribs both toward said interior surface of the commutator and outwardly with respect to the original configuration of each of said ribs thereby to form an additional rib on both sides of each of said original ribs whereby a plurality of generally T-shaped ribs are provided which are integral with said interior surface of the commutator;
   flowing plastic material into engagement with said plurality of T-shaped ribs integral with said interior surface of the commutator; and
   allowing said plastic molding material to solidify whereby said plurality of T-shaped ribs provide anchoring surfaces on said interior surface of the commutator which insure the retention of the plastic in close physical association with the commutator.

2. A method of anchoring a copper commutator to plastic as recited in claim 1 wherein said object on which said surface is formed is a sphere.

3. A method of anchoring a copper commutator to plastic as recited in claim 2 wherein the material from which said sphere is made is steel.

4. A method of forming a commutator unit wherein a copper commutator having an interior, circular surface centered about and parallel to the central axis thereof is anchored to a plastic insulating member which spaces the commutator from a metal sleeve which is also centered about the central axis but spaced inwardly from the interior surface of the commutator, which method comprises the steps of:
   forming at equally spaced positions about the circumference of said interior surface of the commutator a plurality of ribs of generally rectangular cross section which extend uniformly both longitudinally along said interior surface and inwardly toward said central axis of the commutator;
   milling the ends of the commutator perpendicular to said central axis thereof so as to make the commutator of prescribed length;
   engaging each of said plurality of ribs at the same end thereof with a steel sphere having a diameter slightly greater than the diameter of the free ends of said ribs but less than the diameter of said interior surface of the commutator;
   pushing said sphere so that the center thereof moves along the central axis of the commutator such that the surface of said sphere progressively deforms a portion of the metal forming each of said ribs both toward said interior surface of the commutator and outwardly with respect to the original configuration of each of said ribs thereby to form an additional rib on both sides of each of said original ribs whereby a plurality of generally T-shaped ribs are provided which are integral with said interior surface of the commutator;
   sawing a plurality of slots in one end of the commutator, said slots being both directed radially outward of said central axis and located between adjacent ones of said ribs;
   positioning the commutator and the metal sleeve in a molding die with the commutator and the sleeve being centered about the same central axis in said die;
   flowing plastic material into the space between the commutator and the sleeve thereby permitting the plastic material to engage said plurality of T-shaped ribs integral with said interior surface of the commutator; and
   allowing said plastic molding material to solidify thereby to form an insulating member between the commutator and the sleeve, said T-shaped ribs providing anchoring surfaces on the commutator for insuring the retention of the plastic insulating member in close physical association with the commutators.

References Cited

UNITED STATES PATENTS

| 2,915,658 | 12/1959 | Arnold | 29—597 X |
| 3,066,387 | 12/1962 | Herbst | 29—597 |
| 3,140,414 | 7/1964 | Skjodt | 29—597 X |
| 3,376,443 | 4/1968 | McColl | 29—597 X |

FOREIGN PATENTS 777,025  6/1957  Great Britain.

JOHN F. CAMPBELL, Primary Examiner

C. E. HALL, Assistant Examiner

U.S. Cl. X.R.

264—272, 274; 310—235